United States Patent [19]

Terry

[11] 4,445,002
[45] Apr. 24, 1984

[54] SIDETONE CIRCUIT

[75] Inventor: Michael B. Terry, Denton, Tex.

[73] Assignee: Mostek Corporation, Carrollton, Tex.

[21] Appl. No.: 335,144

[22] Filed: Dec. 28, 1981

[51] Int. Cl.$^3$ .................... H04M 1/58; H04B 1/58
[52] U.S. Cl. ........................... 179/81 A; 179/170 NC
[58] Field of Search ............ 179/81 A, 81 R, 170 NC

[56] References Cited

U.S. PATENT DOCUMENTS

| 3,714,381 | 1/1973 | Matsuda et al. | 179/81 A |
| 4,041,252 | 8/1977 | Cowden | 179/170 NC |
| 4,113,996 | 9/1978 | Sanderson | 179/170 NC |

FOREIGN PATENT DOCUMENTS

| 2833722 | 2/1980 | Fed. Rep. of Germany | 179/170 NC |
| 1586410 | 3/1981 | United Kingdom | 179/170 NC |

OTHER PUBLICATIONS

*Telekomunikacye* (Yugoslavia), vol. 26, No. 3, 1977, pp. 40-42; "Electronic Telephone Equipment," By J. Pavic.

Primary Examiner—G. Z. Rubinson
Assistant Examiner—Keith E. George

[57] ABSTRACT

A sidetone circuit (44) is connected to the terminals of a two-line telephone system. The sidetone circuit (44) receives inputs from a DTMF source (62) and a microphone (72). These inputs are selectively passed through a circuit (82) to produce a modulating signal which controls a current source (46) and a current (54). The current source (46) is connected between the telephone line terminals. The input audio signal from the microphone (72) modulates the current source (46) to impress a voltage upon the telephone line. The current source (54) is connected between a first of the telephone lines and a balance node (60). A resistor (58) is connected between the balance node and the second of the telephone lines. An incoming audio signal over the telephone line is coupled to the balance node (60) for summing with an inverted audio signal. The input audio signal from the microphone (72) is further coupled to the balance node (60). The inverted subscriber audio signal serves to attenuate the noninverted subscriber audio signal. The resulting signal at the balance node (60) is coupled through a capacitor (120) to an amplifier (88) for driving an output speaker (104). As a result of this circuit configuration the incoming audio signal has a minimum attenuation while a maximum amplitude signal is applied to the telephone line and a controlled sidetone signal is returned to the subscriber's speaker (104).

3 Claims, 1 Drawing Figure

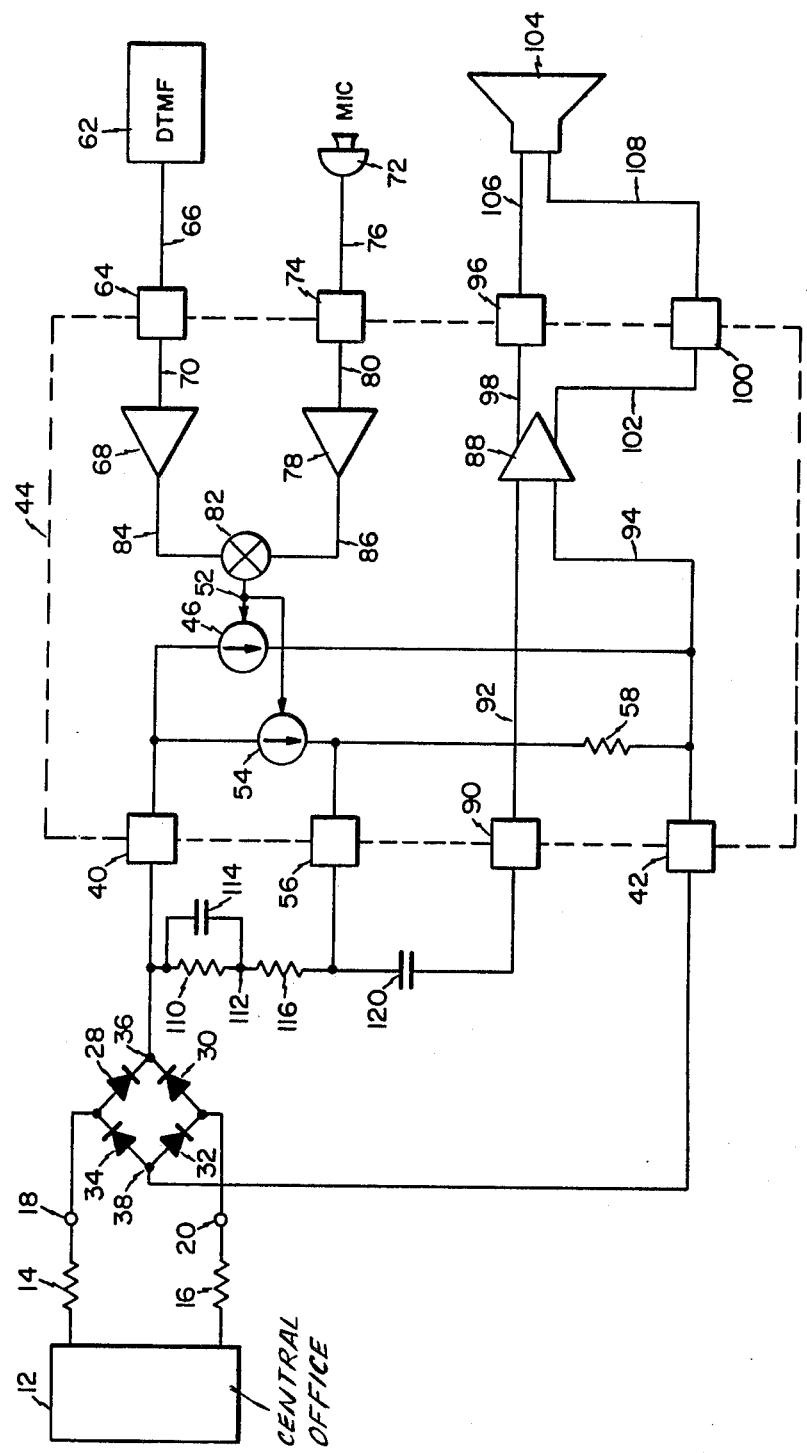

SIDETONE CIRCUIT

TECHNICAL FIELD

The present invention pertains generally to telephone circuits and more particularly to an anti-sidetone circuit for use in a telephone system.

BACKGROUND OF THE INVENTION

In communicating over a telephone line, it is desirable to feed back a portion of the audio signal that is input by the subscriber to his own speaker. This allows the subscriber to hear his own voice. However, if the feedback portion of the audio signal is not properly attenuated it disturbs the subscriber causing him to speak more quietly and thus, sufficient signal levels are not sent. The transmitted audio signal and the incoming received signal are transmitted together over a two-way telephone line. Only a portion of the subscriber's voice signal is fed back to the speaker with the incoming received signal.

Wheatstone bridge circuits have typically been employed in integrated circuits to attenuate the portion of the subscriber's voice that is fed back to the speaker and to provide a portion of the subscriber's voice signal to his own speaker. One disadvantage with the Wheatstone bridge configuration is that it normally utilizes a large number of external components for a subscriber circuit.

In view of the above problems, there exists a need for an anti-sidetone circuit that decreases the required number of external components, applies the maximum transmitted signal to the telephone line and allows easy control of the signal fed back to the subscriber's speaker.

SUMMARY OF THE INVENTION

A selected embodiment of the present invention is a sidetone circuit which is connected to first and second terminals of the telephone line. The sidetone circuit receives an audio input signal, generates an audio output signal and operates in conjunction with a plurality of external components. The sidetone circuit includes a first current driver which is connected between the first and second terminals of the telephone line and is modulated by the audio input signal. The second current driver is connected between the first terminal and a balance node wherein the second current driver is also modulated by the audio input signal. A resistor is connected between the balance node and the second terminal of the telephone line. At least one of the external components is connected between the first terminal of the telephone line and the balance node. At least one of the external components is further connected between a balance node and a second node. An amplifier has the input thereof connected to the second node with the output of the amplifier producing the audio output signal for the sidetone circuit.

The signal received from the telephone line is summed with a portion of the audio input signal from the subscriber at the balance node and it is this summation signal that is transmitted to the subscriber's speaker. This provides a sidetone to the speaker and the sidetone has a selected amplitude.

BRIEF DESCRIPTION OF THE DRAWINGS

For a more complete understanding of the present invention and the advantages thereof, reference is now made to the following description taken in conjunction with the accompanying FIGURE in which the FIGURE illustrates a schematic block diagram of a sidetone circuit which incorporates the present invention.

DETAILED DESCRIPTION OF THE INVENTION

Referring to the FIGURE, there is shown a schematic block diagram of a telephone subscriber's circuit connected to a telephone line. A signal is generated at a central office 12 and transmitted along a two-line telephone loop represented by the resistors 14 and 16. The resistors 14 and 16 represent the impedance of the telephone lines. The resistors 14 and 16 are connected to input terminals 18 and 20, respectively.

The voltage polarity on the input terminals 18 and 20 can vary depending upon the orientation of the connections to the telephone line. To accommodate both possible polarity connections to the telephone line, a bridge network comprising diodes 28, 30, 32 and 34 is employed. The diode 28 has the anode thereof connected to the terminal 18 and the cathode thereof connected to a node 36. The diode 30 has the cathode thereof connected to node 36 and the anode thereof connected to the terminal 20. The diode 32 has the cathode thereof connected to the terminal 20 and the anode thereof connected to a node 38. The diode 34 has the anode thereof connected to the node 38 and the cathode thereof connected to the terminal 18. This bridge configuration insures that node 36 is made positive relative to node 38.

The node 36 is connected to a terminal 40. The node 38 is connected to a terminal 42. The terminal 40 comprises the V+ of an integrated circuit 44 within the dashed lines and the node 42 comprises the ground terminal of the circuit 44. Terminals 40 and 42 are coupled to the telephone lines through the diode bridge circuit.

A current source 46 is connected between terminal 40 and terminal 42. The current source 46 draws current from terminal 40 and sinks the current to the terminal 42. The current source 46 has a modulating input signal transmitted through a line 52.

A current source 54 is connected between terminal 40 and terminal 56. A resistor 58 is connected between terminal 56 and terminal 42. The current source 54 draws current from terminal 40 and drives this current through resistor 58. The current through the current source 54 is controlled by a modulating input signal received through line 52 and is therefor proportional to the current passed through the current source 46. In the circuit of the present invention, the current through the current source 54 is approximately 1/19th of the current through the current source 46.

Since the current from the current source 54 is injected into the resistor 58, a modulated voltage is developed across the resistor 58. When the current through the current source 46 is modulated by a signal on the modulating line 52, the current through the current source 54 is similarly modulated.

A dual tone multi-frequency source is represented by a block 62 (hereinafter termed DTMF). The DTMF source 62 is connected to a terminal 64 by a control input signal line 66. The terminal 64 is connected to the input of an amplifier 68 by a signal line 70. The DTMF source 62 generates a plurality of dual tones that convey the dialing information for the telephone number called by the subscriber. The DTMF source 62 is a circuit which is well documented in the art.

A microphone 72 is connected to a terminal 74 by a signal input line 76. An amplifier 78 has the input thereof connected to the terminal 74 by a line 80.

The output of the amplifier 68 is provided to one input of a selection circuit 82 through a line 84 and the output of amplifier 78 is provided to a second input of the selection circuit 82 through a line 86. The output of the selection circuit 82 generates the modulating signal that is transmitted through line 52 to the current sources 46 and 58.

The microphone 72 produces an audio signal that is amplified by the amplifier 78 and passed through the selection circuit 82 to produce the modulating signal that modulates the current sources 46 and 54. In a similar manner the DTMF source 62 also generates a signal that is amplified by the amplifier 68 and passed through the selection circuit 82 to generate a signal for modulating the current sources 46 and 54.

A receiver amplifier 88 has a first input connected to a terminal 90 through a line 92 and a second input connected to the terminal 42 through a line 94. The amplifier 88 has a first output connected to a terminal 96 through a line 98 and a second output connected to a terminal 100 through a line 102. A speaker 104 has a first input thereof connected to the terminal 96 through a line 106 and a second input thereof connected to the terminal 100 through a line 108. The receiver amplifier amplifies a signal that is developed across the lines 92 and 94 and outputs this signal to the terminals 96 and 100 through the lines 98 and 102, respectively. The output developed across the terminals 96 and 100 is input to the speaker 104 to produce an audio output from circuit 44.

A resistor 110 is connected between the node 36 and a node 112. A capacitor 114 is connected between the node 36 and the node 112. A resistor 116 is connected between the node 112 and terminal 56. A capacitor 120 is connected between the terminal 56 and the terminal 90. The resistors 110 and 116 and the capacitor 114 comprise a filter to enhance the receipt of high frequency signals by the subscriber circuit. The capacitor 120 is a coupling capacitor.

Referring now to the FIGURE, the operation of the circuit of the present invention is described in detail. To transmit an audio signal from the subscriber's circuit to the central office, an alternating voltage is superimposed across the terminals 18 and 20. This alternating signal is detected at the central office 12 as a varying current. When a signal is transmitted to the subscriber's circuit from the central office 12, an alternating voltage is superimposed on the telephone lines at the central office 12 and this results in a corresponding alternating voltage across the terminals 18 and 20. To receive the incoming signal, the subscriber's circuit need only amplify the alternating voltage and drive a speaker.

In a similar manner the transmission of a signal from a subscriber requires that a modulating voltage be applied to the terminals 18 and 20. To modulate the voltage across the terminals 18 and 20 the current through the subscriber's circuit 44 is varied in response to the subscriber audio input.

It is desirable to feed back a portion of the subscriber's transmitted signal to his own speaker and the feedback method of circuit 44 is described below.

The current source 46 draws current from one of the telephone lines and returns current through the other of the telephone lines. When this current is constant, a constant voltage is impressed across the terminals 18 and 20. If this current is varied, the variation will result in a change in voltage across the terminals 18 and 20. An audible signal applied to the input of the microphone 72 is amplified by the amplifier 78 and input to the selection circuit 82 to develop a modulating signal which is passed through line 52. This modulating signal varies the current which passes through the current source 46. As described above, for each variation in the current of the current source 46, there is developed a proportionally smaller change in the current through the current source 54. This change is reflected as a voltage change across the resistor 58.

The alternating voltage across the terminals 18 and 20 is the same as the voltage across the nodes 36 and 38 reduced by the voltage drops of the diodes. The voltage on the node 36 is coupled through the resistors 110, 116 and the capacitor 114 to the terminal 56. The voltage at terminal 56 is also impressed across the resistor 58. The alternating voltage at terminal 56 is also coupled through the capacitor 120 to the terminal 90. The terminal 56 has a summation signal resulting from the modulation of the current source 54 and an incoming signal from the central station 12. This summation signal is coupled through the capacitor 120 to the node 90 and input to the amplifier 88 through the line 92. This summation signal is subsequently amplified by the amplifier 88 and output by the speaker 104.

As noted above, it is desirable to attenuate the transmitted signal before it is fed back to the speaker 104. To accomplish this, the current source 54 impresses a voltage across the resistor 58 that is inverted with respect to the transmitted voltage from the current source 46 impressed across the nodes 36 and 38. When the transmitted voltage across the nodes 36 and 38 is coupled to the terminal 56, the signal resulting from the current source 54 will substantially attenuate the transmitted signal present at terminal 56. This attenuated signal is then coupled to the input terminal 90 and amplified by the receiver amplifier 88 and output to the speaker 104. The received signal from the central office 12, on the other hand, is provided to terminal 56 without any cancelling signal present.

Although the above description is for an audible signal input to the microphone, the result is the same if a signal is input to the terminal 64 from the DTMF source 62.

The following is an example to illustrate the operation of the circuit of the present invention. Consider a momentarily increasing audio signal input to the microphone 72 which results in an increasing signal that is input to the current source 46. An increasing signal to the current source 46 and current source 54 causes an increase in the currents therethrough which in turn lowers the voltage on node 36. However, the increasing current in the current source 54 results in an increasing voltage at terminal 56. When the voltage across the nodes 36 and 38 due to the current sources 46 and 54 is decreased and coupled across the filter circuit comprising resistors 110 and 116 and the capacitor 114, there is produced a decreasing voltage at terminal 56. The voltage at terminal 56 is increasing due to the current from current source 54 but is momentarily decreasing due to the decreasing voltage at node 36. This results in a substantial signal cancellation at terminal 56 for the subscriber's signal from microphone 72. The resultant signal is coupled through the capacitor 120 to the receiver amplifier 88 for output by the speaker 104.

For an incoming signal, however, the alternating signal between terminals 36 and 38 results in a corresponding signal on the terminal 56 but there is no inverted signal present at terminal 56 to provide cancellation. Therefore, the received signal is essentially passed to amplifier 88 with the attenuation due only to the resistors 110 and 116. In summary, the circuit of the present invention is a circuit fof feeding back a portion of the subscriber's signal and providing a cancellation signal to attenuate the portion of the transmitted signal that is fed back. The incoming signal from the central telephone office is provided to the subscriber's speaker with little attenuation.

Although the preferred embodiment of the invention has been described in detail, it should be understood that various changes, substitutions and alterations can be made therein without departing from the spirit and scope of the invention as defined by the appended claims.

I claim:

1. A sidetone circuit for connecting to first and second terminals of a telephone line, receiving an audio input signal, generating an audio output signal and operating in conjunction with a plurality of external components, said sidetone circuit comprising:
   a first current driver connected between said first and said second terminals and modulated by said audio input signal;
   a second current driver connected between said first terminal and a balance node, said second current driver modulated by said audio input signal;
   a resistor connected between said balance node and said second terminal;
   at least one of said external components connected between said first terminal and said balance node;
   at least one of said external components connected between said balance node and a second node, and
   amplifier means having the input thereof connected to said second node, said amplifier means producing said audio output signal.

2. A sidetone circuit for operation in conjunction with discrete components and connected to a telephone circuit, said sidetone circuit receiving an audio input signal and generating an audio output signal, comprising:
   first and second terminals for connection to said telephone circuit;
   a third terminal for receiving said audio input signal;
   a fourth terminal for transmitting said audio output signal therethrough;
   a fifth terminal for connection to said first terminal by at least one of said discrete components;
   a sixth terminal for connection to said fifth terminal by a least one further discrete component;
   a first current driver circuit connected between said first and said second terminals and having a control terminal thereof coupled to said third terminal wherein the current through said first current driver circuit is a function of said audio input signal;
   a second current driver circuit connected between said first terminal and said fifth terminal and having a control terminal thereof coupled to said third terminal wherein the current through said second current driver circuit is a function of said audio input signal;
   resistor means connected between said second terminal and said fifth terminal; and
   means for amplifying a signal at said sixth terminal and coupling said amplified signal to said fourth terminal to provide said audio output signal.

3. A sidetone circuit for communicating through a telephone line comprising:
   a microphone input terminal for receiving an audio input signal;
   an amplifier for amplifying said audio input signal to provide a modulating signal;
   a first current source connected between a first terminal of said telephone line and a second terminal of said telephone line, said first current source receiving said modulating signal for modulating the current therethrough, the modulation of said first current source impressing a modulated first voltage across the terminals of said telephone line;
   a second current source connected between said first terminal and a balance terminal, said second current source connected to receive said modulating signal for modulating the current therethrough;
   a first resistor connected between said balance terminal and said second terminal, the current from said second current source impressing a modulated second voltage across said first resistor;
   a filter circuit having a first capacitor and second resistor connected in parallel, said filter circuit connected serially with a third resistor between said first terminal and said balance terminal, said filter circuit coupling both said modulated first voltage and an incoming audio signal from said telephone line to said balance terminal;
   a second capacitor for coupling said balance terminal to a receiver input terminal;
   a receiver amplifier having the input thereof connected to said receiver input terminal; and
   a speaker connected to the output of said receiver amplifier for converting the output of said receiver amplifier to an audible signal wherein said modulated second voltage is inverted and attenuated with respect to said modulated first voltage, said modulated second voltage attenuating said modulated first voltage at said balance terminal such that said audio input signal is attenuated at said speaker relative to said incoming audio signal at said speaker.

* * * * *